(12) United States Patent
Sakai et al.

(10) Patent No.: US 12,152,132 B2
(45) Date of Patent: Nov. 26, 2024

(54) TIRE RUBBER COMPOSITION

(71) Applicants: The Yokohama Rubber Co., Ltd., Tokyo (JP); Shinshu University, Nagano (JP)

(72) Inventors: Tomoyuki Sakai, Kanagawa (JP); Masayuki Kawazoe, Kanagawa (JP); Toru Noguchi, Nagano (JP)

(73) Assignees: The Yokohama Rubber Co., Ltd., Tokyo (JP); Shinshu University, Nagano (JP)

( * ) Notice: Subject to any disclaimer, the term of this patent is extended or adjusted under 35 U.S.C. 154(b) by 1133 days.

(21) Appl. No.: 16/975,067

(22) PCT Filed: Feb. 25, 2019

(86) PCT No.: PCT/JP2019/007087
§ 371 (c)(1),
(2) Date: Aug. 21, 2020

(87) PCT Pub. No.: WO2019/167889
PCT Pub. Date: Sep. 6, 2019

(65) Prior Publication Data
US 2020/0392309 A1    Dec. 17, 2020

(30) Foreign Application Priority Data
Feb. 27, 2018    (JP) .................. 2018-032793

(51) Int. Cl.
| C08L 1/04 | (2006.01) |
| B60C 1/00 | (2006.01) |
| C08L 7/02 | (2006.01) |
| C08L 9/04 | (2006.01) |
| C08L 9/08 | (2006.01) |
| C08L 11/02 | (2006.01) |

(52) U.S. Cl.
CPC .................. *C08L 1/04* (2013.01); *B60C 1/00* (2013.01); *C08L 7/02* (2013.01); *C08L 9/04* (2013.01); *C08L 9/08* (2013.01); *C08L 11/02* (2013.01)

(58) Field of Classification Search
CPC ...... C08L 1/04; C08L 7/02; C08L 9/04; C08L 9/08; C08L 11/02; B60C 1/00
USPC .................................................... 106/163.01
See application file for complete search history.

(56) References Cited

U.S. PATENT DOCUMENTS

| 2015/0111998 A1 | 4/2015 | Kawamoto et al. |
| 2019/0211163 A1 | 7/2019 | Ito et al. |

FOREIGN PATENT DOCUMENTS

| JP | 2013144815 A | 7/2013 |
| JP | 2015098576 A | 5/2015 |
| JP | 2017052942 A | 3/2017 |
| JP | 6271823 B1 | 1/2018 |
| WO | 2016158682 A1 | 10/2016 |
| WO | 2018008700 A1 | 1/2018 |
| WO | 2018012507 A1 | 1/2018 |

OTHER PUBLICATIONS

International Search Report in PCT/JP2019/007087 dated May 28, 2019.

*Primary Examiner* — Melissa S Swain
(74) *Attorney, Agent, or Firm* — Global IP Counselors, LLP

(57) ABSTRACT

Provide is a rubber composition for a tire that improves mechanical properties beyond conventional levels. The rubber composition for a tire according to an embodiment of the present invention contains from 1 to 50 parts by mass of oxidized cellulose nanofibers blended in 100 parts by mass of diene rubber containing 5% by mass or greater of modified diene rubber having 0.1% by mol or greater of a polar group.

9 Claims, No Drawings

TIRE RUBBER COMPOSITION

CROSS-REFERENCE TO RELATED APPLICATION

This application is a U.S. National Stage application of International Application No. PCT/JP2019/007087, filed Feb. 25, 2019, which claims priority to Japanese Patent Application No. 2018-032793, filed Feb. 27, 2018, the contents of each of which are hereby incorporated herein by reference.

TECHNICAL FIELD

The present invention relates to a rubber composition for a tire and particularly relates to a rubber composition for a tire that improves mechanical properties.

BACKGROUND ART

In pneumatic tires, excellent steering stability and durability are required, and thus it is important that the rubber composition for a tire constituting tires has excellent mechanical properties such elastic modulus and hardness. In general, in order to enhance the mechanical properties, fillers such as carbon black are blended; however, there is a problem in that when the blended amount increases, the specific gravity increases, which leads to an increase in rolling resistance.

Patent Document 1 discloses the basic properties of a rubber composition is enhanced by dispersing cellulose nanofibers that have been opened in rubber. However, there is room for further improvement in the rubber composition containing cellulose nanofibers, and there has been a demand for higher mechanical properties.

CITATION LIST

Patent Literature

Patent Document 1: JP 2015-98576 A

SUMMARY OF INVENTION

Technical Problem

An object of the present invention is to provide a rubber composition for a tire that improves mechanical properties beyond conventional levels.

Solution to Problem

The rubber composition for a tire according to an embodiment of the present invention that achieves the object described above contains 1 to 50 parts by mass of oxidized cellulose nanofibers blended in 100 parts by mass of diene rubber containing 5% by mass or more of modified diene rubber having 0.1% by mol or greater of a polar group.

Advantageous Effects of Invention

The rubber composition for a tire according to an embodiment of the present invention contains both modified diene rubber having 0.1% by mol or greater of a polar group and oxidized cellulose nanofibers, and therefore, the mechanical properties can be improved beyond conventional levels.

The oxidized cellulose nanofibers can contain from 0.5 to 3.0 mmol/g of a carboxy group. In addition, the polar group is preferably at least one selected from a carboxy group, an acid anhydride group, and an epoxy group. Furthermore, when an interface between the diene rubber and the oxidized cellulose nanofibers is measured by a pulse NMR, a relaxation time $T2m$ of an intermediate component is from 50 to 100 μs when a relaxation time T2 component measured at 60° C. by a solid echo method is divided into three types.

DESCRIPTION OF EMBODIMENTS

The rubber composition for a tire according to an embodiment of the present invention necessarily contains modified diene rubber having 0.1% by mol or greater of a polar group. The modified diene rubber improves the affinity of the oxidized cellulose nanofibers to the diene rubber and improves dispersibility thereof. Examples of the polar group contained in the modified diene rubber include a carboxy group, an acid anhydride group, an epoxy group, a hydroxy group, an amino group, an amide group, a nitro group, a mercapto group, an aldehyde group, an imide group, an alkoxy group, and an isocyanate group, and among these, a carboxy group, an acid anhydride group, and an epoxy group are preferable.

The base of the modified diene rubber is rubber latex and/or liquid rubber (hereinafter, the rubber latex and the liquid rubber are collectively referred to as "rubber latex"). The rubber latex is not particularly limited, and water dispersion latex regularly used in rubber compositions for a tire may be used. For example, natural rubber latex, butadiene rubber latex, styrene butadiene rubber latex, nitrile rubber latex, chloroprene rubber latex, and the like can be examplified. Among these, natural rubber latex, butadiene rubber latex, and styrene-butadiene rubber latex are preferable. In addition, a rubber molecule skeleton portion in each latex may be partially modified by hydrogenation or the like.

Preferable examples of the modified diene rubber include epoxy modified natural rubber latex, epoxy modified butadiene rubber latex, epoxy modified styrene-butadiene rubber latex, carboxy modified natural rubber latex, carboxy modified butadiene rubber latex, carboxy modified styrene-butadiene rubber latex, acid anhydride modified natural rubber latex, acid anhydride modified butadiene rubber latex, acid anhydride modified styrene-butadiene rubber latex, carboxy modified butadiene liquid rubber, carboxy modified styrene-butadiene liquid rubber, acid anhydride modified butadiene liquid rubber, and acid anhydride modified styrene-butadiene liquid rubber.

The modified diene rubber has 0.1% by mol or greater, preferably from 0.2% to 5% by mol, and more preferably from 0.3% to 3% by mol of the polar group. By setting the polar group to be 0.1% by mol or greater, the affinity of the oxidized cellulose nanofibers can be improved. The identification of the polar group in the modified diene rubber can be performed by FT-IR, a solid state NMR, or a solvent-swollen solution NMR. Furthermore, the content of the polar group in the modified diene rubber is determined by previously identifying the rubber composition using gas chromatography, in which a calibration curve has been beforehand created with respect to styrene, butadiene, isoprene, and isobutylene monomer, and calculating the monomer ratio of the polar group by measuring the amount of hetero elements, such as nitrogen or oxygen, which are not contained in the diene rubber, using a combustion-type elemental analysis apparatus.

The modified diene rubber can be prepared by known production methods or can be obtained by selection as appropriate from commercially available products. As a typical production method, a method in which a peroxide is mixed in a rubber latex and epoxidized, and a preparation method in which a maleic anhydride is added to an extruder are examplified. The content of the polar group in the modified diene rubber can be adjusted by the amount of peroxide added and/or the reaction conditions, and the like.

The content of the modified diene rubber is 5% by mass or greater, preferably from 8% to 100% by mass, more preferably from 10% to 50% by mass, and still more preferably from 12% to 30% by mass based on 100% by mass of the diene rubber. When the content of the modified diene rubber is less than 5% by mass, the affinity of the diene rubber and the oxidized cellulose nanofibers cannot be sufficiently improved.

The rubber composition for a tire of the present invention can include other diene rubbers in addition to the modified diene rubber. Examples of the other diene rubbers include natural rubber, butadiene rubber, styrene-butadiene rubber, butyl rubber, nitrile rubber, and chloroprene rubber. These other diene rubbers are not rubber latex, but may be a polymer having a weight-average molecular weight of 100000 to 10000000, and can have excellent mechanical properties such as rubber strength and elastic modulus.

The oxidized cellulose nanofibers are ultrafine fibers made of cellulose and having an average fiber diameter from 1 to 1000 nm. The raw material of the oxidized cellulose nanofibers may be derived from wood or non-wood (bacteria, algae, cotton, or the like).

A known defibration method can be used as a method for producing oxidized cellulose nanofibers. Examples of the defibration method include, as disclosed in JP 2008-1728 A, a method in which a chemical oxidation treatment is performed on a raw material to facilitate defibration, and then mechanical shear force is applied to defibrate the material. By defibration in this way, the oxidized cellulose nanofibers can be defibrated more finely and uniformly with low energy. Examples of the chemical oxidation treatment include an oxidation treatment by 2,2,6,6-tetramethylpiperidine-1-oxyl (hereinafter, referred to as "TEMPO"), 4-acetamido-TEMPO, 4-carboxy-TEMPO, 4-amino-TEMPO, 4-hydroxy-TEMPO, 4-phosphonooxy-TEMPO, phosphoric acid ester, and periodic acid.

The oxidized cellulose nanofibers may have a carboxy group. The content of the carboxy group contained in the oxidized cellulose nanofiber is preferably from 0.5 to 3.0 mmol/g, more preferably from 0.6 to 2.5 mmol/g, still more preferably from 0.8 to 2.2 mmol/g, and even more preferably from 1.0 to 2.0 mmol/g. The content of the carboxy group can be adjusted by the amount of the oxidizing agent added and/or the treatment time described above. The content of the carboxy group can be determined by an additional oxidation treatment with sodium chlorite and electrical conductivity titration according to the method described in, T. Saito, A. Isogai, "TEMPO-mediated oxidation of native cellulose. The effect of oxidation conditions on chemical and crystal structures of the water-insoluble fractions", Biomacromolecules, Vol. 5, p. 1983 to 1989, 2004.

In addition to chemical modification as an oxidation treatment during the defibration described above, after the defibration, the surface of the oxidized cellulose nanofibers can be subjected to a cellulase treatment, carboxymethylation, esterification, and a treatment with a cationic polymer, or the like to improve compatibility with the polymer to be complexed. By such treatments, the affinity to the rubber latex or the like can be improved.

The average fiber diameter of the oxidized cellulose nanofibers is preferably from 1 to 1000 nm, and more preferably from 1 to 50 nm. An average aspect ratio (fiber length/fiber diameter) of the oxidized cellulose nanofiber is preferably from 10 to 1000, and more preferably from 50 to 1000. In a case where the average fiber particle diameter and/or average aspect ratio is less than the aforementioned range, the dispersibility of the oxidized cellulose nanofiber decreases. If the average fiber particle diameter and/or average aspect ratio exceeds the aforementioned range, the reinforcing performance of the oxidized cellulose nanofiber decreases. In the present specification, the average fiber diameter and average fiber length of the oxidized cellulose nanofibers are determined as follows. A dispersion of fine cellulose in water at a solid content from 0.05% by weight to 0.1% by weight is prepared, and through TEM observation or SEM observation, an electron microscope image is obtained by setting the magnification as appropriate in accordance with the size of the fibers to be constituted, and the average value of the fiber diameter and fiber length measured for at least 50 or more fibers in this image is used. The average aspect ratio (fiber length/fiber diameter) is calculated from the average fiber length and the average fiber diameter obtained as described above.

In an embodiment of the present invention, from 1 to 50 parts by mass, preferably from 3 to 45 parts by mass, more preferably from 5 to 40 parts by mass of the oxidized cellulose nanofibers are blended with 100 parts by mass of the diene rubber. In a case where the blended amount of the oxidized cellulose nanofibers is less than 1 part by mass, the mechanical properties cannot be sufficiently improved. Furthermore, when the blended amount of the oxidized cellulose nanofibers exceeds 50 parts by mass, the cost of producing the rubber composition increases.

The rubber composition for a tire may also contain other fillers in addition to the oxidized cellulose nanofiber. Examples of the other fillers include carbon black, silica, talc, mica, calcium carbonate, and magnesium oxide. Among these, carbon black and silica are preferable. These other fillers can be blended alone or a plurality of types can be blended in combination.

The rubber composition for a tire may also contain various additives that are commonly used in the rubber composition for a tire within a range that does not impair the object of the present invention. Examples thereof include a vulcanization or crosslinking agent, a vulcanization accelerator, an anti-aging agent, a plasticizer, a processing aid, a liquid polymer, a terpene resin, and a thermosetting resin. These additives may be kneaded by any commonly known method to form a rubber composition, and can be used for vulcanization or crosslinking. Blended amounts of these additives may be any known conventional amount, so long as the objects of the present invention are not hindered.

The method for producing the rubber composition for a tire is not particularly limited, but preferably an aqueous solution containing the oxidized cellulose nanofibers and the modified diene rubber latex are mixed and prepared into a homogeneous solution, and then dried to produce a master batch of the oxidized cellulose nanofibers and the modified diene rubber. The obtained master batch can be kneaded and mixed with the diene rubber and other components of the rubber composition for a tire to produce the rubber composition for a tire.

The concentration of the oxidized cellulose nanofibers contained in the aqueous solution is preferably from 0.1% to 10% by mass, and more preferably from 0.1% to 10% by mass. By setting the concentration of the oxidized cellulose nanofibers to be within such as a range, the oxidized cellulose nanofibers that have been opened in the aqueous solution can be dispersed in a substantially homogeneous manner. The method of mixing the oxidized cellulose nanofibers and the modified diene rubber is not particularly limited, and for example, a roll kneading apparatus, a propeller type stirring apparatus, a homogenizer, a rotary stirring apparatus, and a magnetic stirring apparatus can be used. In particular, the oxidized cellulose nanofibers and the modified diene rubber can be mixed by a roll kneading method using a roll kneading apparatus.

Furthermore, in the master batch of the oxidized cellulose nanofibers and the modified diene rubber obtained by drying, the oxidized cellulose nanofibers are in an amount of preferably from 0.1 to 60 parts by mass, more preferably from 1 to 50 parts by mass, and still more preferably from 5 to 40 parts by mass, with respect to 100 parts by mass of the modified diene rubber. By setting the content of the oxidized cellulose nanofibers in the master batch to be within such a range, the oxidized cellulose nanofibers that have been opened in the master batch can be dispersed in a substantially homogeneous manner. The obtained master batch can be blended and mixed as a component of the rubber composition for a tire.

In the rubber composition for a tire according to an embodiment of the present invention, when an interface of the opened oxidized cellulose nanofibers dispersed in the diene rubber is measured by a pulse NMR, a relaxation time $T2m$ of an intermediate component is from 50 to 100 μs when a relaxation time T2 component measured at 60° C. by a solid echo method is divided into three types. The fact that the molecular mobility at the interface between the modified rubber and the oxidized cellulose nanofibers is restricted in this way indicates that the interface is firmly adhered, and the mechanical properties of the rubber composition for a tire are improved beyond conventional levels.

The method of measuring the interface of the oxidized cellulose nanofibers by the pulse NMR, the measurement conditions, and the relaxation time $T2m$ of the intermediate component can be as follows.

The rubber composition was injected into a NMR tube with a diameter of 9 mm, and a spin-spin relaxation time (T2) in a relaxation time at 60° C. was determined using a pulse NMR spectrometer MU-25 by a solid echo method (available from JEOL Ltd.). For measuring T2, a measurement sample is prepared such that the amount of rubber is 0.3 g or greater, and preferably 0.3 to 0.6 g. In a case where the amount of rubber is 0.3 g or greater, a signal of proton is sufficiently obtained and the measurement accuracy is guaranteed. The number of times of integration is preferably from 1000 to 10000, and when the number of times of integration is 1000 or less, the measurement accuracy is low. A decay curve of the obtained signal is separated into three components by performing curve fitting with Weibull modulus of 2, 1 to 2, and 1 from the shorter relaxation time T2. As described above, the relaxation time and the composition of the hydrogen atom can be determined for each component. In a case of an oxidized cellulose rubber composition, at 60° C., the shortest relaxation time is due to hydrogen atoms derived from the crystals of cellulose nanofibers. The relaxation time $T2m$, which corresponds to an intermediate component, is considered to be a relaxation time of a rubber molecule that is bound to the cellulose.

Embodiments according to the present invention are further described below by Examples. However, the scope of the present invention is not limited to these Examples.

EXAMPLE

Example 1

80 g of modified styrene-butadiene rubber latex (Nipol LX435 available from Zeon Corporation, carboxy group modified amount of 2% by mol, solid content concentration of 50% by mass) and 800 g of aqueous solution of oxidized cellulose nanofibers (Cellenpia available from Nippon Paper Industries Co., Ltd. carboxy group modified amount of 1.5 mmol/g, solid content concentration of 1.0% by mass) were mixed using a homogenizer at 5000 rpm for 5 minutes to uniformly disperse the mixture to obtain a dispersion of modified styrene-butadiene rubber latex and oxidized cellulose nanofibers. The mass ratio of the solid content of the modified styrene-butadiene rubber latex to the solid content in the aqueous solution of the oxidized cellulose nanofibers (oxidized cellulose nanofibers) is 5:1. The obtained dispersion of the modified styrene-butadiene rubber latex and the oxidized cellulose nanofibers was dried at 40° C. for 72 hours to prepare a master batch of the modified styrene-butadiene rubber and the oxidized cellulose nanofibers.

Example 2

10 g of maleic anhydride modified butadiene liquid rubber (RICON 184MA6 available from Cray Valley, carboxy group modified amount of 2.7% by mol), and 2000 g of aqueous solution of oxidized cellulose nanofibers (Cellenpia available from Nippon Paper Industries Co., Ltd., carboxy group modified amount of 1.5 mmol/g, solid content concentration of 1.0% by mass) were mixed using a homogenizer at 5000 rpm for 5 minutes to uniformly disperse the mixture to obtain a dispersion of the modified butadiene liquid rubber and the oxidized cellulose nanofibers. The mass ratio of the solid content of the modified butadiene liquid rubber to the solid content in the aqueous solution of the oxidized cellulose nanofibers (oxidized cellulose nanofibers) is 1:2. The obtained dispersion of the modified butadiene liquid rubber and the oxidized cellulose nanofiber was dried at 40° C. for 72 hours to prepare a master batch of the modified butadiene rubber and the oxidized cellulose nanofibers.

For preparing 11 kinds of rubber compositions for a tire (Examples 3 to 5, Comparative Examples 1 to 7, and Reference Example) having the composition shown in Tables 1 to 3, components, excluding sulfur and a vulcanization accelerator, of the rubber composition for a tire were weighed and kneaded for about 5 minutes using a 1.7 L sealed Banbury mixer, and the obtained mixture was discharged and cooled at room temperature. The cooled mixture was subjected to a roll, and sulfur and a vulcanization accelerator were added and mixed to prepare a rubber composition for a tire.

Using the obtained rubber composition for a tire, vulcanization molding was performed for 30 minutes at 160° C. using a mold having a predetermined shape to create a test sample, and 100% tensile stress and tensile strength at break were measured by a method described below. Furthermore, the relaxation time $T2m$ was measured using the test samples of Examples 3 to 5, Comparative Examples 1 to 7, and Reference Example 100% Tensile Stress and Tensile Strength at Break A dumbbell-shaped JIS No. 3 test piece was cut out of the obtained test samples in accordance with JIS K6251. A tensile test was performed in accordance with JIS K6251 under the conditions of a temperature of 20° C. and a tensile speed of 500 mm/min to measure the tensile stress and the tensile strength at break at 100% elongation. The obtained results are listed in the fields of "100% stress" and "tensile strength at break" as an index value for which the value of Comparative Example 1 is 100 in Table 1, the value of Comparative Example 4 is 100 in Table 2, and the value of Comparative Example 6 is 100 in Table 3, respectively. A greater index value indicates higher 100% tensile stress and tensile strength at break, which mean that the mechanical properties are excellent.

Relaxation Time T2m

The obtained test sample was injected into a NMR tube with a diameter of 9 mm, and a spin-spin relaxation time (T2) in a relaxation time at 60° C. was determined using a pulse NMR spectrometer MU-25 (available from JEOL Ltd.) by a solid echo method. The number of times of integration was 1024. A decay curve of the obtained signal was separated into three components by performing curve fitting with Weibull modulus of 2, 1 to 2, and 1 from the shorter relaxation time T2 to determine the relaxation time T2m.

TABLE 1

|  |  | Comparative Example 1 | Comparative Example 2 | Comparative Example 3 | Example 3 | Reference Example |
| --- | --- | --- | --- | --- | --- | --- |
| SBR-1 (latex) | Part by mass | 100 | 100 |  |  |  |
| MB of Example 1 | Part by mass |  |  |  | 120 |  |
| Modified SBR (latex) | Part by mass |  |  | 100 |  | 100 |
| Oxidized CNF | Part by mass |  | 20 |  |  |  |
| Carbon black | Part by mass |  |  |  |  | 20 |
| Zinc oxide | Part by mass | 3.0 | 3.0 | 3.0 | 3.0 | 3.0 |
| Stearic acid | Part by mass | 1.0 | 1.0 | 1.0 | 1.0 | 1.0 |
| Sulfur | Part by mass | 1.5 | 1.5 | 1.5 | 1.5 | 1.5 |
| Vulcanization accelerator | Part by mass | 1.0 | 1.0 | 1.0 | 1.0 | 1.0 |
| 100% stress | Index value | 100 | 500 | 338 | 2438 | 575 |
| Tensile strength at break | Index value | 100 | 191 | 347 | 797 | 472 |
| Relaxation Time T2 m | μs | N.D. | 151 | N.D. | 72 | 126 |

* In the table, "N.D." indicates that T2 m cannot be detected because it cannot be divided into three components.

Types of raw materials used as indicated in Table 1 are described below.

SBR-1 (latex): Nipol LX112, available from Zeon Corporation; solid content concentration of 40.5% by mass MB of Example 1: Master batch of the modified styrene-butadiene rubber and the oxidized cellulose nanofibers obtained in Example 1.

Modified SBR (latex): Nipol LX435, available from Zeon Corporation; carboxy group modified amount of 2% by mol, solid content concentration of 50% by mass Acid value CNF: Aqueous solution of oxidized cellulose nanofibers, Cellenpia available from Nippon Paper Industries Co., Ltd.; carboxy group modified amount of 1.5 mmol/g; solid content concentration of 1.0% by mass Carbon black: SEAST KH, available from Tokai Carbon Co., Ltd., nitrogen adsorption specific surface area of 93 m$^2$/g Zinc oxide: Zinc Oxide III, available from Seido Chemical Industry Co., Ltd.

Stearic acid: beads stearic acid, available from NOF Corporation

Sulfur: MUCRON OT-20 available from Shikoku Chemicals Corporation.

Vulcanization accelerator: NOCCE1ER CZ, available from Ouchi Shinko Chemical Industrial Co., Ltd.

TABLE 2

|  |  | Comparative Example 4 | Comparative Example 5 | Example 4 |
| --- | --- | --- | --- | --- |
| NR | Part by mass | 75 | 75 | 75 |
| SBR-2 | Part by mass | 25 |  |  |
| MB of Example 1 | Part by mass |  |  | 30 |
| Modified SBR (latex) | Part by mass |  | 25 |  |

TABLE 2-continued

|  |  | Comparative Example 4 | Comparative Example 5 | Example 4 |
|---|---|---|---|---|
| Carbon black | Part by mass | 70 | 70 | 70 |
| Oil | Part by mass | 5 | 5 | 5 |
| Phenolic resin | Part by mass | 10 | 10 | 10 |
| Methylene donor | Part by mass | 1.0 | 1.0 | 1.0 |
| Anti-aging agent | Part by mass | 3.0 | 3.0 | 3.0 |
| Zinc oxide | Part by mass | 3.0 | 3.0 | 3.0 |
| Stearic acid | Part by mass | 2.0 | 1.0 | 1.0 |
| Sulfur | Part by mass | 4.0 | 1.5 | 1.5 |
| Vulcanization accelerator | Part by mass | 3.0 | 1.0 | 1.0 |
| 100% stress | Index value | 100 | 116 | 200 |
| Tensile strength at break | Index value | 100 | 92 | 105 |
| Relaxation Time T2 m | μs | 190 | 182 | 73 |

The types of raw materials used as indicated in Table 2 are described below.

NR: Natural rubber, TSR20, Tg: −65° C.

SBR-2: Styrene-butadiene rubber; Nipol 1502, available from Zeon Corporation

MB of Example 1: Master batch of the modified styrene-butadiene rubber and the oxidized cellulose nanofibers obtained in Example 1.

Modified SBR (latex): Nipol LX435, available from Zeon Corporation; carboxy group modified amount of 2% by mol, solid content concentration of 50% by mass Carbon black: SEAST KH, available from Tokai Carbon Co., Ltd., nitrogen adsorption specific surface area of 93 $m^2/g$ Oil: Extract No. 4S, available from Showa Shell Sekiyu K.K.

Phenol resin: Sumiolite resin PR-NR-1, available from Sumitomo Bakelite Company Limited Methylene donor: NOCCE1ER H, available from Ouchi Shinko Chemical Industrial Co., Ltd.

Anti-aging agent: Santoflex 6PPD, available from Flexsys

Zinc oxide: Zinc Oxide III, available from Seido Chemical Industry Co., Ltd.

Stearic acid: beads stearic acid, available from NOF Corporation

Sulfur: MUCRON OT-20, available from Shikoku Chemicals Corporation.

Vulcanization accelerator: NOCCE1ER CZ, available from Ouchi Shinko Chemical Industrial Co., Ltd.

MA-BR (liquid rubber): Maleic anhydride modified butadiene liquid rubber, RICON 184MA6, available from Cray Valley, carboxy group modified amount of 2.7% by mol Carbon black: SEAST KH, available from Tokai Carbon Co., Ltd., nitrogen adsorption specific surface area of 93 $m^2/g$ Oil: Extract No. 4S, available from Showa Shell Sekiyu K.K.

Anti-aging agent: Santoflex 6PPD, available from Flexsys

Zinc oxide: Zinc Oxide III, available from Seido Chemical Industry Co., Ltd.

Stearic acid: beads stearic acid, available from NOF Corporation

Sulfur: MUCRON OT-20, available from Shikoku Chemicals Corporation.

Vulcanization accelerator: NOCCE1ER CZ, available from Ouchi Shinko Chemical Industrial Co., Ltd.

As is clear from Table 1 to 3, the rubber compositions for a tire of Example 3 to 5 have high 100% tensile stress and tensile strength at break, and excellent mechanical properties.

Since the rubber composition for a tire of Comparative Example 2 does not contain the modified diene rubber, the 100% tensile stress and the tensile strength at break thereof are inferior to those of Example 3.

Since the rubber composition for a tire of Comparative Example 3 does not contain the oxidized cellulose nanofi-

TABLE 3

|  |  | Comparative Example 6 | Comparative Example 7 | Example 5 |
|---|---|---|---|---|
| SBR-2 | Part by mass | 100 | 90 | 90 |
| MA-BR (liquid rubber) | Part by mass |  | 10 |  |
| MB of Example 2 | Part by mass |  |  | 30 |
| Carbon black | Part by mass | 50 | 50 | 50 |
| Oil | Part by mass | 5 | 5 | 5 |
| Anti-aging agent | Part by mass | 3.0 | 3.0 | 3.0 |
| Zinc oxide | Part by mass | 3.0 | 3.0 | 3.0 |
| Stearic acid | Part by mass | 2.0 | 2.0 | 2.0 |
| Sulfur | Part by mass | 1.0 | 1.0 | 1.0 |
| Vulcanization accelerator | Part by mass | 1.0 | 1.0 | 1.0 |
| 100% stress | Index value | 100 | 94 | 175 |
| Tensile strength at break | Index value | 100 | 98 | 110 |
| Relaxation Time T2 m | μs | 147 | 172 | 91 |

Types of raw materials used as indicated in Table 3 are described below.

SBR-2: Styrene-butadiene rubber; Nipol 1502, available from Zeon Corporation bers, the 100% tensile stress and the tensile strength at break thereof are inferior to those of Example 3.

Since the rubber composition for a tire of Comparative Example 5 does not contain the oxidized cellulose nanofibers, the 100% tensile stress and the tensile strength at break thereof are inferior to those of Example 4.

Since the rubber composition for a tire of Comparative Example 7 does not contain the oxidized cellulose nanofibers, the 100% tensile stress and the tensile strength at break thereof are inferior to those of Example 5.

The invention claimed is:

1. A rubber composition for a tire comprising:
   1 to 50 parts by mass of oxidized cellulose nanofibers blended in 100 parts by mass of a diene rubber,
   the diene rubber containing 5% by mass or greater of a modified diene rubber,
   the modified diene rubber including at least one of: a rubber latex and a liquid rubber, and
   the modified diene rubber having 0.1% by mol or greater of a polar group selected from the group consisting of: a carboxy group, an acid anhydride group, an epoxy group, a hydroxy group, an amino group, an amide group, a nitro group, a mercapto group, an aldehyde group, an imide group, an alkoxy group, and an isocyanate group.

2. The rubber composition for a tire according to claim 1, wherein the oxidized cellulose nanofibers contain from 0.5 to 3.0 mmol/g of a second carboxy group.

3. The rubber composition for a tire according to claim 1, wherein the polar group is at least one selected from the group consisting of: the carboxy group, the acid anhydride group, and the epoxy group.

4. The rubber composition for a tire according to claim 1, wherein when an interface between the diene rubber and the oxidized cellulose nanofibers is measured by a pulse NMR, a relaxation time T2m of an intermediate component is from 50 to 100 μs when a relaxation time T2 component measured at 60° C. by a solid echo method is divided into three types.

5. The rubber composition for a tire according to claim 2, wherein the polar group is at least one selected from the group consisting of: the carboxy group, the acid anhydride group, and the epoxy group.

6. The rubber composition for a tire according to claim 2, wherein when an interface between the diene rubber and the oxidized cellulose nanofibers is measured by a pulse NMR, a relaxation time T2m of an intermediate component is from 50 to 100 μs when a relaxation time T2 component measured at 60° C. by a solid echo method is divided into three types.

7. The rubber composition for a tire according to claim 3, wherein when an interface between the diene rubber and the oxidized cellulose nanofibers is measured by a pulse NMR, a relaxation time T2m of an intermediate component is from 50 to 100 μs when a relaxation time T2 component measured at 60° C. by a solid echo method is divided into three types.

8. The rubber composition for a tire according to claim 1, wherein the modified diene rubber contains 0.1% by mol to 5% by mol of the polar group.

9. The rubber composition for a tire according to claim 1, wherein the diene rubber contains 5% by mass to 50% by mass of the modified diene rubber.

* * * * *